Patented June 26, 1945

2,379,100

UNITED STATES PATENT OFFICE 2,379,100

WELL DRILLING MUD AND PROCESS

Everett P. Partridge, Beaver, Pa., assignor to Hall Laboratories, Inc., Pittsburgh, Pa., a corporation of Pennsylvania No Drawing. Application January 18, 1945, Serial No. 573,467

10 Claims. (Cl. 252—8.5)

This application is a continuation-in-part of my copending application, Serial No. 463,816, filed October 29, 1942, which in turn was a continuation-in-part of my application, Serial No. 351,983, filed August 9, 1940.

This invention relates generally to the drilling of oil and similar wells and to a drilling mud for use in the process. In drilling oil wells, for example, it is customary to employ a mud or fluid which serves various purposes which are well known. The drilling mud is circulated from a sump above the ground down through the bore, around the drilling tool where it picks up the chips formed by the drill, and then up the bore to screens where the chips are removed, and to the sump from which the mud is again circulated through the bore. The mud also serves to lubricate the drill pipe, to seal the wall of the bore, and to provide a hydrostatic head which prevents the well from blowing out, in case high formation pressures are encountered.

In order to increase the weight of the drilling mud, it has been customary in the past to add weighting material, such, for example, as barite or hematite. While these or other materials are satisfactory from the standpoint of increasing the weight of the mud, they increase the viscosity of the mud, so that it becomes more difficult to pump. If it is attempted to increase the weight of the mud by increasing the proportion of clay to water either with or without the addition of weighting agents, the viscosity likewise is increased too much.

It has been proposed heretofore to increase the fluidity of the mud by adding thereto a solution of rapidly soluble sodium hexametaphosphate or sodium pyrophosphate. These phosphates have the property of dispersing or deflocculating the mud and making it more fluid. In this manner, when the ratio of solids to water is increased, or weighting materials are added to the mud, the increased viscosity which would result therefrom may be overcome by the use of the rapidly soluble metaphosphate or pyrophosphate.

The use of the rapidly water-soluble metaphosphate or pyrophosphate has resulted in considerable improvement in drilling muds, but is open to certain objections. For example, even if sodium hexametaphosphate or sodium pyrophosphate is added in the solid state to the mud in the sump, it will dissolve in a very short time. The properties of the mud in the sump may thereby be adjusted in a desirable direction insofar as conditions at the surface of the ground are concerned. However, as the mud is circulated downward through the bore, it is subjected to increasing temperatures which may exceed 200° F. The increase in temperature affects the properties of the mud adversely to a greater or less extent and tends to destroy the effects of the dissolved metaphosphate by causing reversion to the ineffective orthophosphate, and likewise, to destroy the effect of the dissolved pyrophosphate both by precipitation as highly insoluble calcium or magnesium pyrophosphate and by reversion to the ineffective orthophosphate.

While the loss of the metaphosphate or pyrophosphate during circulation through the bore may be made up by further addition of these agents at the surface of the ground, it is difficult to control the conditioning of the mud at the surface so that it will exhibit optimum properties at increased temperatures deep in the bore, without at the same time overtreating with respect to surface conditions and hastening the approach of the time when the mud will no longer respond to treatment because of the accumulation of chemicals in it.

In accordance with the present invention, finely divided solid particles of a slowly soluble molecularly dehydrated alkali-metal phosphate glass having a molar ratio of alkali-metal oxide to $P_2O_5$ less than 1:1, are introduced into the mud and are circulated with the mud down the bore. These slowly soluble particles dissolve continuously in the mud to maintain the desired properties in it and particularly to maintain the mud in a suitably fluid condition.

The term "molecularly dehydrated phosphate" is recognized as describing those phosphate compounds which may be degarded as derived from phosphoric acid or monobasic or dibasic orthophosphate or mixtures thereof by removal of water of constitution.

Slowly soluble molecularly dehydrated alkali-metal phosphate glass having a molar ratio of alkali-metal oxide to $P_2O_5$ less than 1:1 may be formed from the fusion of a monobasic orthophosphate with an excess of phosphoric acid as illustrated by the reaction:

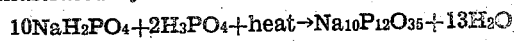

The product $Na_{10}P_{12}O_{35}$ may be described as $5Na_2O.6P_2O_5$, which has a molar ratio of $Na_2O$ to $P_2O_5$ of about 0.8:1. The melt is rapidly chilled in order to produce the product in glassy form. By a similar reaction, the corresponding slowly soluble molecularly dehydrated potassium phosphate glass having a molar ratio of $K_2O$ to $P_2O_5$ of less than 1:1 may be produced.

Commercially, the slowly soluble molecularly dehydrated alkali-metal phosphate glasses may be made from phosphoric acid and a convenient compound of the desired alkali-metal such as the oxide, hydroxide, carbonate or chloride, sufficient heat being applied to drive off substantially all of the water and in the case of metal salts such as the carbonate or chloride to drive off the acidic constituent, such as carbon dioxide or hydrogen chloride. Thus, for example, I may produce a slowly soluble molecularly dehydrated sodium phosphate glass having a molar ratio of $Na_2O$ to $P_2O_5$ of approximately 0.6:1.0 by the reaction of three mols of sodium carbonate with ten mols of phosphoric acid, according to the following equation:

$$3Na_2CO_3+10H_3PO_4+heat \rightarrow 2Na_3P_5O_{14}+15H_2O+3CO_2$$

The melt is quickly chilled, in order to produce the product in glassy form. The product $Na_3P_5O_{14}$ may be written as $3Na_2O \cdot 5P_2O_5$. This product has a mol per cent composition of 37.5 $Na_2O$ and 62.5 $P_2O_5$, which is a molar ratio of $Na_2O$ to $P_2O_5$ of 0.6:1.0. The corresponding potassium phosphate glass may be made in a similar manner or glasses containing two or more different alkali metals may be made from phosphoric acid and two or more compounds containing different alkali metals. Thus I can make sodium-potassium glasses, sodium-lithium glasses, potassium-lithium glasses or sodium-potassium-lithium glasses in which the molar ratio of total alkali-metal oxide to phosphorous pentoxide is less than 1:1, preferably from 0.5:1 to 0.9:1.

Other compounds of the alkali-metals may be used in place of the carbonates and the ratios of alkali-metal and phosphorus in the starting mixture may be varied so that the phosphate glass will have a molar ratio of alkali-metal oxide to $P_2O_5$ of less than 1:1. It is preferred that this ratio be between about 0.5:1 and 0.9:1 and more particularly that the ratio be about 0.6:1. As the ratio of alkali-metal oxide to $P_2O_5$ is lowered, the phosphate glass becomes more hydroscopic and more difficult to manufacture and handle and accordingly in commercial practice it is usually not advisable to employ phosphate glasses having a ratio of alkali-metal oxide to $P_2O_5$ lower than about 0.5:1.

In place of adding to the drilling mud slowly soluble alkali-metal phosphate glass containing a plurality of alkali-metals, I may add to the mud a mechanical mixture of two or more different alkali-metal phosphate glasses, the mixture having a molar ratio of alkali-metal oxide to $P_2O_5$ of less than 1, preferably between about 0.5:1 and 0.9:1.

The rate of solution of molecularly dehydrated phosphates varies over an extremely wide range.

Thus 100 grams of sodium metaphosphate glass commonly known as sodium hexametaphosphate ground to pass a 200-mesh screen when mixed with one liter of water will dissolve in less than one minute, thereby producing a concentration of 100,000 P. P. M. Even higher concentrations are easily and almost instantaneously obtained. On the other hand, when 100 grams of molecularly dehydrated sodium phosphate glass of the mol per cent composition $45Na_2O.55P_2O_5$ is mixed with one liter of water, an hour is required for it to dissolve. Thus the rate of solution of the acid phosphate glass is less than 1/60 that of the sodium hexametaphosphate under comparable conditions.

The molecularly dehydrated alkali-metal phosphate glasses having a molar ratio of alkali-metal oxide to $P_2O_5$ less than 1:1 may be referred to for convenience as "acid phosphate glasses." These acid phosphate glasses, while being sufficiently soluble in a previously untreated mud to materially lower the viscosity of the mud, nevertheless are of an entirely different and lower order of solubility than the rapidly soluble glassy sodium metaphosphate commonly known as sodium hexametaphosphate or Graham's salt. The rate of solution of the acid phosphate glasses used according to my invention is only a small fraction of the rate of solution of sodium hexametaphosphate. The term "slowly soluble" is used in the claims to define such molecularly dehydrated phosphate glass.

The effect on the viscosity and gel strength of well drilling mud produced by the addition to the mud of various materials is shown in Table I. In carrying out the tests, a mud was made up to contain 10% of clay, 20% of ground barite, and 3% of bentonite, and was aged with stirring. To a 2000-gram portion of the aged mud was added 3 grams of the material to be tested, ground to pass a 200-mesh screen. The sample was then thoroughly mixed and allowed to stand 0.5 hour, when the viscosity and 5-minute gel strength were determined by means of a McMichael viscosimeter. The sample was then allowed to stand overnight, approximately 15 hours, after which it was mixed thoroughly, and the viscosity and gel strength were again determined. The sample was then heated to 80° C. for two hours and allowed to cool and stand overnight, after which the viscosity and gel strength were again determined. The original mud with no addition of treating chemical had a viscosity of 64 poises at 20 R. P. M., and a 5-minute gel strength of 341 on an arbitrary scale.

TABLE I

*Synthetic mud*

| No. | Composition of treating material mol per cent | Viscosity, poises | | | 5-minute gel strength arbitrary units | | |
|---|---|---|---|---|---|---|---|
| | | 0.5 hr. | Overnight | 2 hr. at 80° C. to overnight | 0.5 hr. | Overnight | 2 hr. at 80° C. to overnight |
| | No treating material | 64 | 76 | 82 | 341 | 379 | 401 |
| | $50Na_2O, 50P_2O_5$ (sodium meta-phosphate glass) | 10.5 | 13.5 | 35.5 | 82 | 94 | >125 |
| 1 | $45Na_2O, 55P_2O_5$ (acid phosphate glass) | 9 | 6 | 21 | 65 | 77 | 117 |
| 2 | $40Na_2O, 60P_2O_5$ (acid phosphate glass) | 56 | 20.7 | 13 | | | |

It will be seen that the acid phosphate glasses numbered 1 and 2 materially reduce the viscosity of the mud and furthermore that they are considerably more effective in reducing the viscosity of the mud than the sodium metaphosphate glass when the mud is heated.

The behavior of very slowly soluble acid phosphate glass was also verified upon an actual formation mud which had already been heavily treated in the field with a variety of chemicals. The results are shown in Table II.

grams of mud, with vigorous mixing for five minutes. The viscosity of the mixture was then determined by immersing the spindle of a Brookfield viscosimeter in the mud and reading the viscosity 1½ minutes after mixing was stopped. Similar measurements were made after the mud had stood for an hour, after it had stood over-

TABLE II

*Formation mud*

| No. | Composition of treating material mol per cent | Viscosity, poises | | | 5-minute gel strength arbitrary units | | |
|---|---|---|---|---|---|---|---|
| | | 0.5 hr. | Overnight+ | 0.5 hr. at 80° C. overnight | 0.5 hr. | Overnight+ | 0.5 hr. at 80° C. overnight |
| 1 | Mud treated in the field | 16. | 15.5 | 17. | 72 | 71 | 72 |
| | 50Na$_2$O.50P$_2$O$_5$ (sodium metaphosphate glass) | 11.5 | 12.5 | 16.5 | 57 | 53 | 64 |
| | 45Na$_2$O.55P$_2$O$_5$ (acid phosphate glass) | 9.5 | 9.5 | 11.5 | 44 | 43 | 54 |

In this case, as the mud was already satisfactorily dispersed or deflocculated, the further decreases in viscosity were not as pronounced as in the case of the synthetic mud. Nevertheless, it is noteworthy that significantly greater effects were shown by the acid phosphate glass than by the sodium metaphosphate glass, particularly after heating.

The effect on the viscosity of well drilling mud produced by the addition to the mud of acid phosphate glasses containing various combinations of alkali-metal oxides is shown in Table III. In obtaining these results the same general procedure was followed as in the work which provided the data for Table I. The various glasses were made by mixing the proper amounts of the respective alkali-metal carbonates and of phosphoric acid, heating the mixture for about half an hour at approximately 900° C. to drive off water and carbon dioxide, and quenching the melt between metal surfaces to produce a clear glass.

A portion of each glass was powdered. This powdered material was used in testing the ability of the glass to reduce the viscosity of a drilling mud mixture.

The mud was made up to contain approximately 9.5% of "Baroco" clay, a commercial clay used in drilling mud, 19.5% of "Baroid," a commercial weighting agent for drilling mud consisting essentially of barium sulphate, and 0.95% of "Aquagel," a commercial bentonite used in drilling mud, the remainder of the mixture being water. Each test was conducted by adding 3 grams of powdered acid phosphate glass to 2000 night, and after it had then been heated for two hours at 80° C. and had been allowed to cool to room temperature by standing overnight again. In each case the mud was stirred for five minutes before the viscosity reading was taken 1½ minutes after the cessation of stirring.

All readings were made with a No. 3 spindle on the Brookfield viscosimeter rotating at 12 R. P. M., and the readings were converted to poises.

TABLE III

*Synthetic mud*

| No. | Composition of treating materials, mols | | | | Viscosity, poises | | | |
|---|---|---|---|---|---|---|---|---|
| | Na$_2$O | K$_2$O | Li$_2$O | P$_2$O$_5$ | After 5 min. stirring | 1 hr. | Overnight | 2 hr. at 80° C. to overnight |
| 1 | No treating material. | | | | 67.6 | 69.6 | | |
| 2 | 1.1 | | | 1 | 14.0 | | 19.8 | 32.2 |
| 3 | | 1 | | 2 | 29.6 | 18.0 | 21.8 | 43.8 |
| 4 | 1 | 1 | 1 | 6 | 40.4 | 12.4 | 12.8 | 25.6 |
| 5 | 1 | 1 | | 4 | 22.6 | 12.0 | 14.8 | 23.0 |
| 6 | | 2 | 2 | 7 | 26.4 | 11.4 | 12.6 | 20.0 |
| 7 | 1 | | | 4 | 51.2 | 45.8 | 23.8 | 16.2 |

It will be noted from the figures in Table III that each of the five acid phosphate glasses (Nos. 3, 4, 5, 6 and 7) decreases the viscosity of the mud very markedly. Four of the five proved more effective in holding down the viscosity of the mud after it had been heated than did the approximately neutral relatively soluble commercial sodium phosphate glass (No. 2).

In carrying out the process of conditioning well drilling mud by means of the slowly soluble acid phosphate glasses, I prefer to maintain a reserve of undissolved solid particles of the treating material in the mud as it is circulated throughout the cycle, adding more of the treating material to the mud continuously or at intervals to make up the unavoidable losses, and controlling this makeup by testing the properties of the mud at intervals. The test methods heretofore employed are suitable in which the viscosity of the mud is measured in an approximate manner by the time of efflux of a given quantity from a Marsh funnel, or more precisely by a viscosimeter. The tests should preferably be carried out with the mud held at approximately the maximum temperature in the bore hole, although an experienced operator may be able to maintain satisfactory control by testing the mud at its temperature at the surface of the ground.

Initial adjustment of a mud to the desired level of viscosity may require the addition at the start of a greater amount of acid phosphate glass than would have been necessary if rapidly soluble sodium metaphosphate or sodium pyrophosphate had been used. The additional amount of the acid phosphate glass required to maintain optimum conditions during further operation and the total amount required to complete a bore will, however, be less than if a rapidly soluble treating material were employed. So-called "cutting," "clabbering," or over treatment of the mud by the added chemicals will accordingly be delayed or entirely obviated.

A unique advantage of the process herein described is the automatic response to increase in temperature as the mud circulates down the bore. When the rapidly soluble molecularly dehydrated phosphates are introduced into and dissolve in the mud at the surface of the ground, the effect of increase in temperature as the mud descends the bore is to accelerate the loss of treating chemical by precipitation or revision or both undesirable reactions. In contrast, when finely divided slowly soluble acid phosphate glasses are introduced into the mud, only a limited amount goes into solution. As the temperature increases during passage down the bore, there is an increase in the rate of loss of the effective chemical in solution, but this is offset by the increased rate at which the solid particles of the treating material dissolve to supply fresh chemical to the solution.

Another advantage of the slowly soluble acid phosphate glasses is the fact that they can be stored and handled in humid atmospheres with less tendency toward caking than is exhibited by the readily soluble molecularly dehydrated phosphates heretofore employed.

It will be apparent to one skilled in the art of dispersing or deflocculating clays, pigments, fillers, and finely divided oxides, salts, and mineral matter in general that the slowly soluble acid phosphate glasses may be utilized to advantage as dispersing or deflocculating agents in many operations other than the conditioning of mud in the drilling of bore holes.

The invention is not limited to the preferred materials or preferred manner of practicing the method but may be otherwise embodied or practiced within the scope of the following claims.

I claim:

1. Well drilling mud comprising an aqueous dispersion of clay and solid particles of slowly soluble sodium phosphate glass having a molar ratio of $Na_2O$ to $P_2O_5$ between about 0.5:1 and 0.9:1.

2. Well drilling mud comprising an aqueous dispersion of clay and solid particles of slowly soluble potassium phosphate glass having a molar ratio of $K_2O$ to $P_2O_5$ between about 0.5:1 and 0.9:1.

3. Well drilling mud comprising an aqueous dispersion of clay and solid particles of slowly soluble molecularly dehydrated alkali-metal phosphate glass having a molar ratio of alkali-metal oxide to $P_2O_5$ between about 0.5:1 and 0.9:1.

4. Well drilling mud comprising an aqueous dispersion of clay and solid particles of slowly soluble molecularly dehydrated alkali-metal phosphate glass having a molar ratio of alkali-metal oxide to $P_2O_5$ of about 0.6:1.

5. The process of controlling the viscosity of well drilling mud, which comprises adding thereto solid particles of slowly soluble molecularly dehydrated alkali-metal phosphate glass having a molar ratio of alkali-metal oxide to $P_2O_5$ between about 0.5:1 and 0.9:1.

6. A dispersion of finely divided mineral matter in an aqueous medium, said dispersion containing an effective amount of solid particles of slowly soluble molecularly dehydrated alkali-metal phosphate glass having a molar ratio of alkali-metal oxide to $P_2O_5$ between about 0.5:1 and 0.9:1 which acts to disperse or deflocculate the mineral matter.

7. Well drilling mud comprising an aqueous dispersion of clay and solid particles of slowly soluble alkali-metal phosphate glass containing a plurality of alkali metals, said phosphate glass having a molar ratio of alkali-metal oxides to $P_2O_5$ between about 0.5:1 and 0.9:1.

8. Well drilling mud comprising an aqueous dispersion of clay and solid particles of slowly soluble alkali-metal phosphate glass containing both sodium and potassium, said phosphate glass having a molar ratio of alkali-metal oxides to $P_2O_5$ between about 0.5:1 and 0.9:1.

9. Well drilling mud comprising an aqueous dispersion of clay and solid particles of a mechanical mixture of alkali-metal phosphate glasses containing different alkali metals, said mixture having a molar ratio of alkali-metal oxides to $P_2O_5$ between about 05:1 and 0.9:1.

10. A material adapted to control the viscosity of aqueous well drilling mud, said material comprising slowly soluble alkali-metal phosphate glass containing a plurality of alkali-metals, said phosphate glass having a molar ratio of alkali-metal oxides to $P_2O_5$ between about 0.5:1 and 0.9:1.

EVERETT P. PARTRIDGE.

CERTIFICATE OF CORRECTION.

Patent No. 2,379,100.                                    June 26, 1945.

EVERETT P. PARTRIDGE.

It is hereby certified that error appears in the printed specification of the above numbered patent requiring correction as follows: Page 1, second column, line 36, for "degarded" read --regarded--; page 4, first column, line 25, for "revision" read --reversion--; and second column, line 48, claim 9, for "05:1" read --0.5:1--; and that the said Letters Patent should be read with this correction therein that the same may conform to the record of the case in the Patent Office.

Signed and sealed this 25th day of September, A. D. 1945.

<p align="center">Leslie Frazer</p>

(Seal)                         First Assistant Commissioner of Patents.